April 7, 1964    A. E. RICE ETAL    3,127,632
CASTERS
Filed Nov. 3, 1960

INVENTORS
ALBERT E. RICE
FORD A. RICE
BY
Isler & Ornstein
ATTORNEYS

United States Patent Office 3,127,632
Patented Apr. 7, 1964

3,127,632
CASTERS
Albert E. Rice and Ford A. Rice, both of 552 Leader Bldg., Cleveland 14, Ohio
Filed Nov. 3, 1960, Ser. No. 66,969
3 Claims. (Cl. 16—18)

This invention relates generally to casters, but has reference more particularly to casters of the type in which a rotary floor-engaging element is rotatably mounted on an axle or shaft which is offset horizontally from the vertical stem or swivel axle of the caster.

A primary object of the invention is to provide casters of the character described having novel means for trimming or dressing the sides of the casters.

Another object of the invention is to provide a caster of the character described in which the novel trim or dress for the caster is formed as an integral part of the caster body.

A further object of the invention is to provide novel means for assembling the trim or dress of the caster with other component parts of the caster.

Other objects and advantages of our invention will be apparent during the course of the following description.

In the accompanying drawings forming a part of this specification, and in which like numerals are employed to designate like parts throughout the same, FIG. 1 is a front elevational view of one form of the caster, embodying the invention, with portions thereof broken away to more clearly illustrate the construction of the caster;

Figure 1:
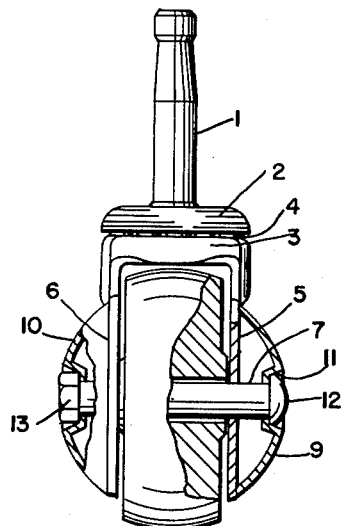
Figure 2:
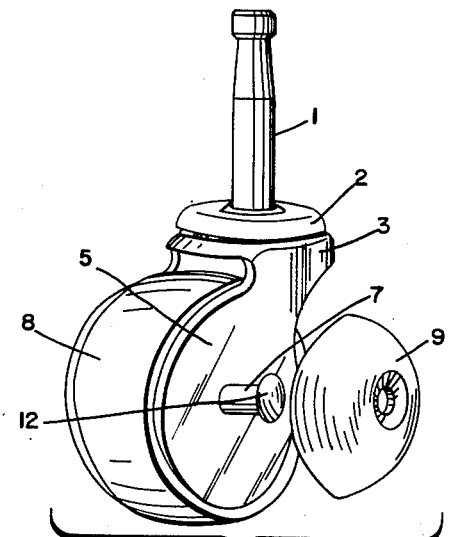
FIG. 2 is a perspective exploded view of the caster of FIG. 1.

Referring more particularly to FIGS. 1 and 2 of the drawings, the caster will be seen to comprise a vertically-extending stem 1, which extends through a plate 2 and through the horizontal upper portion 3 of the caster body, the plate 2 and portion 3 of the body forming the upper and lower races respectively for ball bearings 4.

The caster body is provided with laterally spaced substantially flat discs 5 and 6, which are formed integrally with the portion 3 of the caster body, but extend downwardly and forwardly, so that the axis of these discs is offset horizontally from the axis of the stem 1.

The caster is further provided with a shaft or pin 7, which is mounted on the discs 5 and 6, centrally of the latter, and upon which a caster wheel 8 is revolubly mounted. The ends of the shaft or pin 7 extend beyond the discs 5 and 6, and are utilized for the removable securement to the outer faces of the discs of hollow spherical segments 9 and 10.

The segments 9 and 10 form fittings or trim for the caster, and may be made of metal, plastic, rubber, or other material, of any desired color.

The segments 9 and 10 are provided with axial depressions or recesses 11, and in the assembly of the segments with the discs, the shaft or pin 5 is provided at one end with a head 12 which fits into the recess 11 of the segment 9, while a nut 13 is threadedly secured to the other end of the shaft or pins 5 and fits into the recess 11 of the segment 10. In this manner, the head 12 and nut 13 are partially concealed and do not protrude substantially beyond the outer surfaces of the segments 9 and 10 to constitute a potential source of damage.

FIGS. 3, 4, 5 and 6 illustrate various modifications of the fittings or trim, which may be used instead of the segments 9 and 10 shown in FIGS. 1 and 2.

Figure 3:
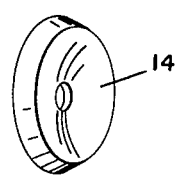
FIGS. 3, 4, 5 and 6 are perspective views, illustrating various modified forms of the side fittings or trim, which may be utilized in the caster of FIG. 1, instead of the side fitting or trim shown in FIG. 1.

The fitting 14 of FIG. 3 is made in the form of a member having a concave outer surface.

Figure 4:
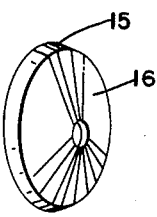

The fitting 15 of FIG. 4 has an outer surface 16 of conical form.

Figure 5:
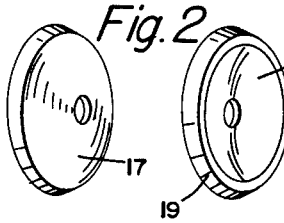

The fitting 17 of FIG. 5 is similar to the segment 9, but is solid instead of hollow.

Figure 6:
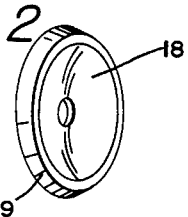

The fitting 18 of FIG. 6 is similar to that of FIG. 3, but is provided with a marginal flange 19.

The fittings or side trim shown in FIGS. 3, 4, 5 and 6 may be made of metal, plastic, rubber, or other material, and of any desired color.

Figure 7:
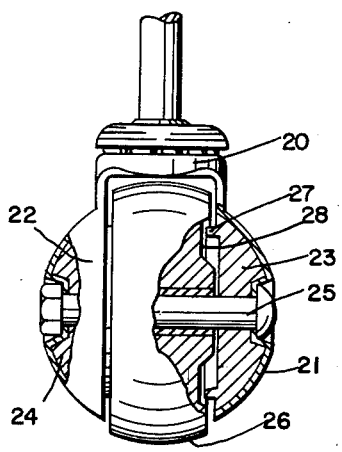
FIG. 7 is a view similar to FIG. 1, but showing a modification of the invention.
Figure 8:
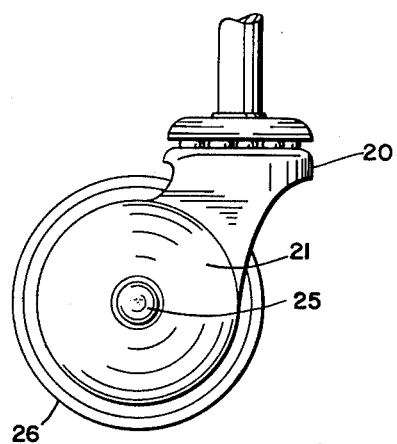
FIG. 8 is a side elevational view of the caster of FIG. 7.

In FIGS. 7 and 8, the caster is generally similar in form and outward appearance to that of the caster in FIGS. 1 and 2, but in this case, the caster body 20 is provided with laterally-spaced elements 21 and 22, which are formed integrally with the body 20, but which are shaped into the form of hollow segments similar to the segments 9 and 10 respectively, and which constitute the side trim for the caster. Here again, the elements 21 and 22 may be of any desired color or ornamentation.

Solid members 23 and 24 of segmental spherical form are mounted on the shaft 25, between the elements 21 and 22 and the wheel 26, and provide fillers for these elements, to prevent lint and other foreign matter from entering these elements. As an aid to prevent such matter from obtaining access to the shaft 25, the members 23 and 24 are provided on their inner faces with annular flanges 27 which extend into annular recesses 28 in the sides of the wheel 26. The fillers 23 and 24 also serve to space the elements 21 and 22 from the sides of the wheel 26.

It is thus seen that we have provided casters having novel means for dressing and trimming the sides of the caster, with the trim or dressing in the form of removable fittings, as well as in the form of integral parts of the caster body, and that we have also provided novel means for assembling the fittings with other component parts of the caster.

It is to be understood that the form of our invention, herewith shown and described, is to be taken as a preferred example of the same, and that various changes may be made in the shape, size and arrangement of parts thereof, without departing from the spirit of the invention or the scope of the subjoined claims.

Having thus described our invention, we claim:

1. In a caster of the character described, a caster body comprising a substantially horizontal upper portion of generally annular form and spaced generally parallel parts of disc-like form extending downwardly from opposite peripheral edges of said upper portion and formed integrally with said upper portion, said spaced parts having central openings therein and having outboard faces, a shaft supported by said caster body, said shaft having end portions extending through said openings and terminating at points spaced from said outboard faces, a caster wheel mounted between said parts and supported for rotation about said shaft, elements disposed adjacent the outboard faces of said disc-like parts and providing trim for the sides of said caster, said elements having central openings through which said shaft passes, said elements having a diameter corresponding substantially with the diameter of said disc-like parts, and means associated with said shaft and bearing against the exterior of said elements for removably clamping said elements to said disc-like parts with the peripheral portions of said elements bearing against the peripheral portions of said disc-like parts.

2. A caster, as defined in claim 1, in which said wheel has a tread surface of spherical form, and said elements have outboard faces of spherical shape forming with the tread surface of said caster wheel a substantially complete sphere.

3. In a caster of the character described, a caster body comprising a substantially horizontal upper portion of generally annular form and spaced hollow parts extending downwardly from opposite peripheral edges of said upper portion and formed integrally with said upper portion, said spaced parts having spherical outboard faces providing trim surfaces for the caster, said parts having central openings therein, a shaft supported by said caster body and extending through said openings, a caster wheel mounted between said parts and supported for rotation about said shaft, said caster wheel having a tread surface of spherical form, which forms with the outboard surfaces of said parts a substantially complete sphere, said caster wheel provided in its sides with annular recesses, and fillers of segmental spherical form enclosed within said spaced parts, said fillers having annular flanges extending therefrom and into said recesses to provide thread guards for said shaft.

References Cited in the file of this patent

UNITED STATES PATENTS

| | | |
|---|---|---|
| 288,633 | Hasenpflug | Nov. 20, 1883 |
| 377,721 | Reed | Feb. 7, 1888 |
| 636,757 | Carraway | Nov. 14, 1899 |
| 1,285,142 | Happensack | Nov. 19, 1918 |
| 1,432,966 | Chesnutt | Oct. 24, 1922 |
| 1,887,436 | Schacht et al. | Nov. 8, 1932 |
| 2,700,173 | Huffman | Jan. 25, 1955 |
| 2,721,668 | Elsner | Oct. 25, 1955 |
| 2,951,258 | Brooks et al. | Sept. 6, 1960 |
| 3,040,371 | Rice et al. | June 26, 1962 |

FOREIGN PATENTS

| | | |
|---|---|---|
| 1,214,843 | France | Nov. 16, 1959 |